Dec. 26, 1961 F. A. KROHM 3,014,463
FLUID MOTOR

Original Filed Nov. 16, 1956 2 Sheets-Sheet 1

INVENTOR.
FRED A. KROHM
BY
Hedrow & Recktenwald.

Dec. 26, 1961 F. A. KROHM 3,014,463
FLUID MOTOR
Original Filed Nov. 16, 1956 2 Sheets-Sheet 2

INVENTOR.
FRED A. KROHM
BY
Redrow & Recktenwald

United States Patent Office 3,014,463
Patented Dec. 26, 1961

3,014,463
FLUID MOTOR
Fred A. Krohm, Hobart, Ind., assignor to The Anderson Company, a corporation of Indiana
Continuation of abandoned application Ser. No. 622,693, Nov. 16, 1956. This application Apr. 6, 1959, Ser. No. 804,543
11 Claims. (Cl. 121—120)

This invention relates to motors and more specifically to fluid motors of the reciprocating type.

A typical example of one use for the motor of this invention is in the field of windshield wiper drives, and currently the windshield wipers of motor vehicles are driven by motors that are powered by either vacuum or electricity. Although these motors have performed satisfactorily and in their own right have their recognized advantages, the demands of the times have necessitated a search for a less expensive, more efficient, and less complicated fluid driven motor that is capable of producing greater power over a wider range of operating conditions.

In the vacuum motor, for instance, the vacuum is derived from the intake manifold of the engine. Since the degree of vacuum produced by the engine and available to drive the vacuum motor varies when varying demands are placed on the engine by an operator, it is usual that the vacuum motor will drive the wiper assembly at different rates of speeds, i.e., when the degree of vacuum is less than normal, the speed of the wiper is slower than normal. So that, for instance, as a vehicle proceeds up an incline under load, the amount of vacuum is decreased considerably and in many instances the wiper elements will just bearly move across the windshield whereby, if the vehicle is traveling in a heavy rain, the wiper cannot clear the glass and a very hazardous condition results. Recent development work such as covered by my U.S. Patent No. 2,761,429, issued September 4, 1956, resulted in a means for varying the stroke of the wiper blade whereby under certain extreme conditions, such as those just enumerated, the arc of the stroke of the arm and blade can be substantially reduced whereby even under reduced vacuum conditions, the speed of the wiper stroke is automatically increased. Although the above-enumerated patent solved some of the problems associated with the use of vacuum driven motors, there are other limitations and considerations that have indicated a turn away from the use of vacuum for such motors. These limitations include such items as an apparent lack of power in a motor of reasonable size to drive the larger wiper blades required by the newer motor vehicles, and an apparent lack of power in such a motor to drive the modern blades which are pressed with a greater force against the glass to prevent the blade from being lifted away from the windshield by wind currents. Furthermore, there is always an ever present desire among automotive engineers to simplify the structure of the wiper motor.

In the use of electrically driven wiper motors, an undesirable condition exists in that the trend in motor vehicle design has been toward adding more and more electrically operated devices to the vehicle as a result of which the vehicle battery has been loaded to a high degree. It is not uncommon on a cold winter night to be driving along with the windshield wipers, heater, defroster, head lights and other electrical devices in operation which produces a drain on the battery such that a long stand in a line of slow-moving traffic can weaken the battery to the point where the engine stalls and emergency service is required. The transfer of the windshield wiper motor from the electrical system of the vehicle to some other drive means is therefore very desirable. The electric driven motor for windshield wipers is also considered to be relatively inefficient and comparatively expensive.

Recently it has been proposed in the automobile industry to install a central air or fluid pump system on the vehicle that is adapted to be driven by the vehicle engine. This pump is capable of placing air or fluid under pressure in the system for delivery to such items as brakes, suspension systems, power-assisted steering, seat adjusters and the like for driving them. Pumps have been developed that are comparatively inexpensive and are capable of handling high volumes of fluid to produce the desired fluid pressures which, as far as can be anticipated, will provide a large reserve for air or fluid driven systems on motor vehicles so that a surplus of air or fluid under pressure will be available to drive a number of fluid-operated accessories such as might be required on future vehicles.

This being the present state of the art, the present invention has been made wherein the preferred form of my invention can be briefly summarized as including certain novel means for passing a fluid through a system of valving to a reciprocating motor to drive it, together with a novel means for changing the reciprocating motion thereof to oscillating motion for driving a windshield wiper assembly or the like. These and other novel combinations and arrangements of parts hereinafter described and particularly set out are included in the appended claims.

Figure 1:
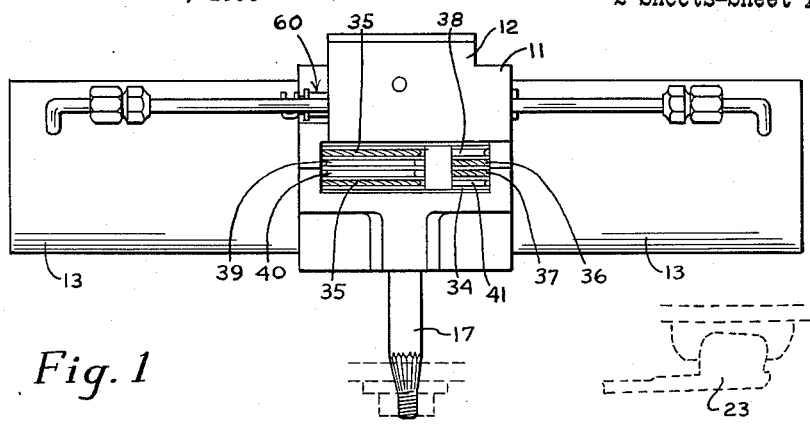
FIGURE 1 is a top plan view of a fluid motor containing the present invention and illustrated as forming a part of a windshield wiper system of a motor vehicle.

The subject application is a continuation of my abandoned application Serial No. 622,693, filed November 16, 1956.

In the embodiment of the fluid motor shown in the drawings, the motor is provided with a casing or housing 11 which includes a block 12 and a pair of laterally extending cylinders 13 containing chambers 14, 15 therein. The cylinders 13 can be formed integral with the block 12 or may be in the form of sleeves threaded into the block 12 as shown at 16 in FIGURE 2. The motor also includes a drive shaft 17 disposed in a plane lying perpendicular to the longitudinal axes of the cylinders, the shaft being supported in suitable bearings 18 and 19 in the block 12. A pair of pistons 21 and 22 are reciprocably disposed in each of the cylinders 13 and are operatively connected with the drive shaft 17 by a novel means which will be presently described. A drive shaft such as shaft 17 is often used in motor vehicles in combination with a suitable linkage for oscillating a wiper carrying arm 23 across the windshield of a motor vehicle.

Figure 3:
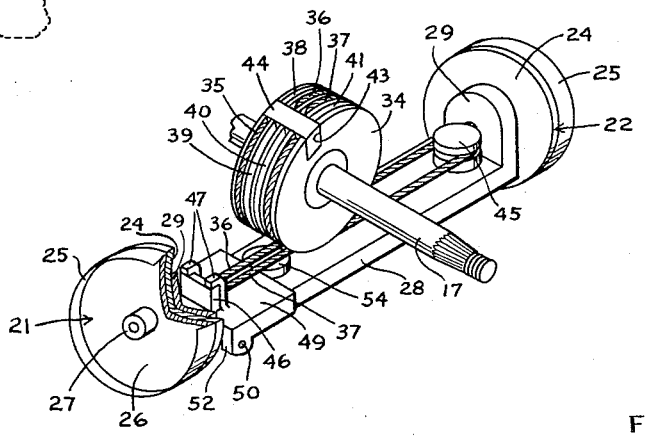
FIGURE 3 is a perspective view of part of my improved fluid motor.

Referring to FIGURE 3, it is seen that each piston 21 and 22 takes the form of a circular plate 24 to which a leather cup 25 is secured by means of a disc 26 and a nut 27. The pistons are rigidly interconnected by a bridge or elongate member 28 having upstanding support means 29 on the opposite ends thereof to which the plates 24 of the pistons are secured respectively. The flange portions of the cups 25 extend from the piston support structure toward the outer ends of chambers 14 and 15 and bear upon the cylinder walls to provide a pair of substantially fluid-tight chambers or cylinders. Fastened to an end wall 31 within each chamber is a resilient pad 32 which acts as a limit means and coacts with the end of its respective piston to prevent over-travel thereof.

During normal operation of the motor, air or fluid under pressure is alternately admitted to and exhausted from the pressure chambers 14, 15 whereupon the pair of pistons 21 and 22, together with their interconnected support 28, are caused to reciprocate back and forth in the housing. The means for alternately admitting and exhausting the fluid to the chambers 14, 15 is accomplished in a novel fashion which will be hereinafter described.

As previously indicated, an important feature of the motor of this invention is the means by which the reciprocating motion of the pistons 21, 22 is converted to an oscillating motion which may be taken off at the drive shaft 17. This means for so converting the motion includes a pulley 34 fixed on said shaft 17 and flexible cables 35, 36 and 37 adapted to be connected at their opposite ends between the bridge member 28 and the pulley for changing the piston motion to oscillating motion.

Figure 2:
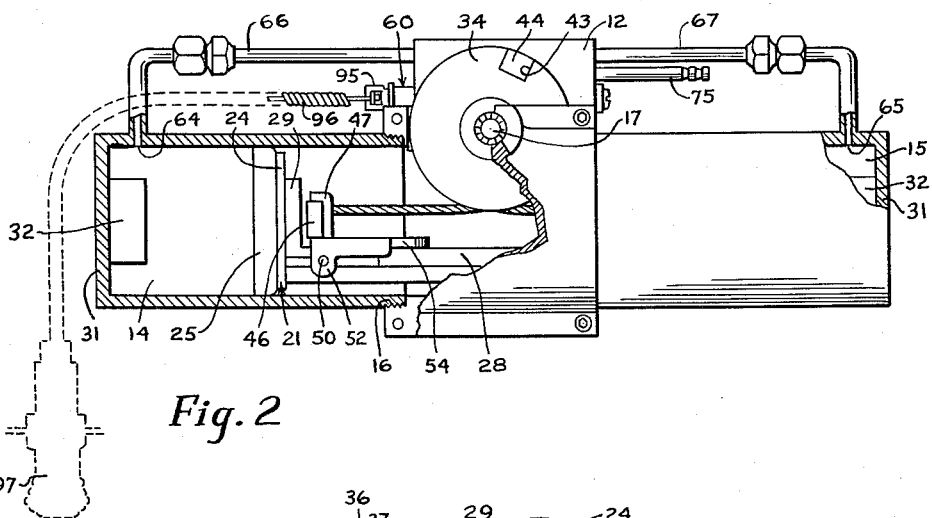
FIGURE 2 is a front elevation of the motor illustrated in FIGURE 1 with some parts broken away and shown in section.

Referring particularly to FIGURES 1 to 3, it is seen that the pulley 34 has a plurality of continuous grooves 38, 39, 40 and 41 formed in the outer surface thereof, into which grooves 38 and 41 the flexible cable 35 is seated. The flexible cable 36 is seated in groove 39 and the flexible cable 37 is seated in groove 40. The pulley 34 has a transverse slot 43 cutting across all of the grooves and into which a key 44 is seated. Fastened to the key 44 is one end of the cable 35 which lies in the groove 38, the cable passing counterclockwise around part of the periphery of the pulley from where it extends substantially tangentially from the pulley and generally parallel to the member 28 to be passed around an anchor pin 45 integral with member 28, back to and part way around the pulley 34 in groove 41 and having the other end fastened to the pulley by the key 44. The cables 36 and 37 each have one end anchored by the key 44 and are passed clockwise around pulley 34 referring to FIGURE 3, these cables being disposed in the grooves 39 and 40, respectively. The cables 36, 37 also extend substantially tangentially from pulley 34 and parallel to the bridge 28 into fixed engagement with a block 46. The block 46 is adjustably held relative to the bridge 28 by means of a pair of hook-shaped retainers 47 which are fastened to a plate 49 slidably disposed on the bridge. The plate 49 is held on the bridge by means of an inwardly projecting pair of lugs 50 carried by depending ears 52 on the plate, which lugs engage under the edges of the bridge 28 for holding the plate on the bridge. If deemed necessary, an eccentric cam 54 may be adjustably positioned on the bridge in contact with the edge of the plate 49 nearest the pulley 34 such that turning the cam about its pivot axis will move the plate 49 to the left as viewed in FIGURE 2, thereby adjustably removing any slack from the cables 35, 36 and 37.

The above-described motor is ready for operation once the proper tension has been set on the cables 35, 36 and 37 with the pistons and motion-changing units installed in the cylinders and by admitting fluid to produce a pressure differential in the chambers 14, 15 the bridge 28 will be made to reciprocate with the pistons. Movement of the bridge in one direction will unwind cable 35 from the pulley and wind cables 36 and 37 onto the pulley, and movement thereof in the other direction will unwind cables 36 and 37 from the pulley and wind cable 35 onto the pulley. This reversal of movement is continuously repeated as soon as the pistons reach the outer ends of their stroke in their respective cylinders 14 and 15 to produce alternate winding and unwinding of the cables about the pulley. This action oscillates the pulley and the shaft 17 about its axis for causing the windshield wiper assembly to oscillate in its arc.

As previously indicated herein, another important feature of this invention lies in the means for directing the fluid flow to the respective pistons for producing the alternating reciprocating motion of the pistons. Referring more generally to FIGURES 2, and 4 to 9, inclusive, the block 12 is shown as containing a series of valve ports and passages, an on and off or actuating valve means 60 and a fluid flow venting and reversing or shuttle valve means 62.

The cylinders or pressure chambers 14, 15 have ports 64, 65, respectively, in the walls thereof which ports are connected by tubes or conduits 66 and 67 to passages in the block 12. The tubes 66 and 67 are connected to the block 12 in communicating relationship, respectively, with passages 68, 69 which have ports 70, 71 opening into a valve chamber 72. A source of fluid under pressure relative to the exhaust, said fluid being delivered to the motor from any suitable supply such as from a pump (not shown) mounted independently on the vehicle engine, is connected to the block 12 by a pipe 75 which communicates with a passage 77 having a port 78 opening into the valve chamber 72. Communicating with the valve chamber 72 are three additional ports 79, 80, 81 each having passageways 82, 83, 84 extending through the block and having ports 85, 86, 87, respectively, communicating with a pressure-tight chamber 89 in which the shuttle valve 62 is slidably mounted. Positioned in the chamber 89 between the ports 85, 86 is an additional port 92 which is adapted, in the preferred form, to be in communication with suitable passageways leading to a relatively low pressure zone with reference to the input, and when a fluid pressure pump is used port 92 may be connected directly to the atmosphere and port 92 is generally referred to as the exhaust port.

Slidably positioned in the valve chamber 72 is the actuating valve 60 which has a U-shaped bracket 95 on one end that is adapted to be engaged by the end connector on a flexible wire 96, see FIGURE 2, which is connected to an actuating knob 97 mounted on the dashboard of an automobile. By pushing or pulling on the knob 97 the valve 60 will be moved to the right or to the left in FIGURES 1 and 2 and thereby place the actuating or fluid flow control valve of the motor in the on or off position.

Figure 5:
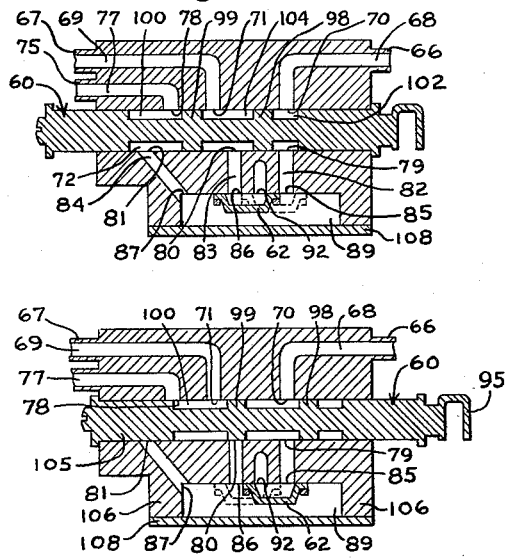
FIGURE 5 is a sectional view taken on the line 5—5 of FIGURE 4 showing the on and off valve in "on" position.

The valve 60 has two relatively narrow lands 98, 99 axially spaced relative to each other in such a way that, depending upon their position, ports in the block 12 are allowed to communicate in a predetermined manner to be described. With the valve 60 in its actuating or "on" position as shown in FIGURE 5, the fluid pressure is admitted through port 78 into valve chamber 72, around a valley 100 of the valve 60, through port 81 into the chamber 89, whereupon, since the shuttle valve 62 has uncovered port 85, the fluid will flow through port 85 back into the valve chamber 72 around a valley 102 in the valve and into port 70 to be conducted through passage 68 and tube 66 to the pressure chamber 14 for driving the pistons 21, 22 to the right as shown in FIGURE 2. The fluid in chamber 15 is simultaneously being exhausted through passage 69, port 71, around a valley 104 in valve 60, port 80, passage 83, port 86 under shuttle valve 62 and to exhaust port 92 under shuttle valve 62.

As the pistons reach the extreme right-hand position, referring to FIGURE 2, the shuttle valve 62 is caused, by means to be later described in detail, to be moved to the right as shown in dotted lines in FIGURE 5 so as to connect the exhaust port 92 with the port 85 and uncover port 86 whereupon fluid under pressure in chamber 89 enters through port 86, flows through passage 83 around valley 104 in the valve 60 through port 71 and passage 69 to conduit 67 to be fed into pressure chamber 15 for driving the pistons 21, 22 to the left, referring to FIGURE 2. The fluid in chamber 14 is exhausted through passageway 68, port 70, valley 102 in valve 60, port 79, passage 82, under shuttle valve 62 and out exhaust port 92. As the pistons reach the extreme left-hand position, the shuttle valve will be moved back to the solid line position shown in FIGURE 5 and the cycle will be repeated.

Figure 6:
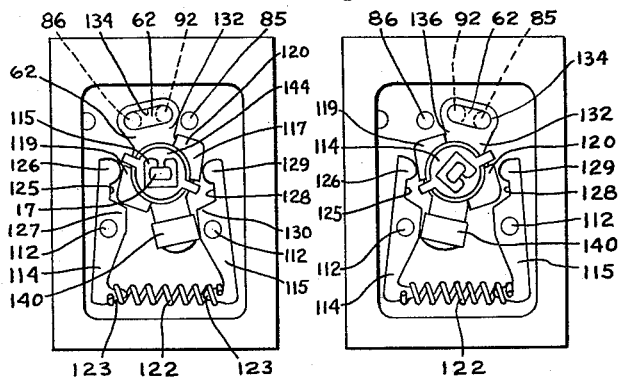
FIGURE 6 is a sectional view similar to FIGURE 5 with the on and off valve in the "off" or "park" position.

Upon moving the knob 97 to the "off" or "park" position, the valve 60 will be moved to the position shown in FIGURE 6 whereupon pressure fluid is delivered to chamber 15 and the shuttle valve 62 will open the chamber 14 to exhaust. To pressurize chamber 15, the valley 100 of the valve 60 will permit the pressure supply port 78 to communicate directly with port 71 which feeds fluid to chamber 15. Chamber 14 is vented as above described. When pistons 21, 22 reach the extreme left-hand position, the shaft 17 will have been rotated sufficiently to cause shuttle valve 62 to move to the dotted line position of FIGURE 6 whereby the port 86 is then uncovered and placed in communication with exhaust port 92 and port 85 is simultaneously placed in communication with the chamber 89. In this position of the shuttle valve 62, the ports 87, 85 are both in communication with chamber 89 to condition the valve mechanism to pressurize chamber 14 as soon as valve 60 is moved to the "on" position. In the above described "off" position of the valve 60, however, chamber 15 is kept continually under pressure so that shaft 17 will be set in such a position as to hold the windshield wiper assembly in a non-use, out-of-the-way position while pressure to chamber 89 is cut off when land 105 on valve 60 covers port 81.

Figure 4:
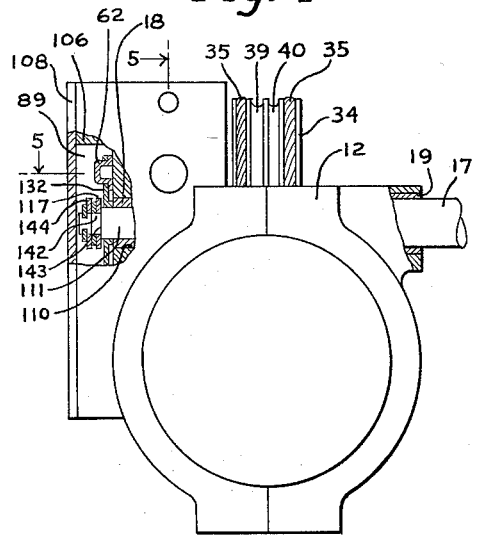
FIGURE 4 is an end view of the motor illustrated in FIGURE 1 with some parts broken away and shown in section.

The shuttle valve 62, which is slidably carried on the block 12, is adapted to direct the flow of inlet and exhaust fluid under different pressures through the selected set of ports which have been placed in registry by the actuating valve 60 as heretofore described. It will be noticed that the shuttle valve assembly 62 is mounted in the generally rectangular chamber 89 defined by the walls 106 extending from the block and to which a cover plate 108 is fastened in pressure-tight relationship. The wall of chamber 89 is provided with a bearing opening 110 which extends through the block into which is received the one end portion 111 of the drive shaft 17 as shown in FIGURE 4.

Figures 7, 8, 9:
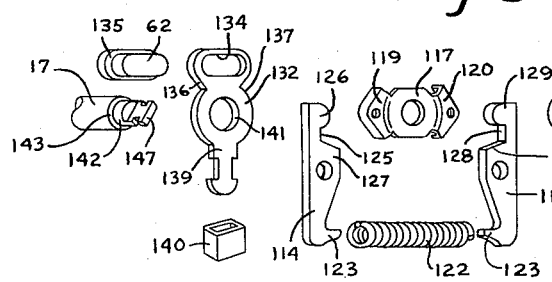
FIGURE 7 is a perspective view of the actuating valve stem.
FIGURE 8 is a front elevation of a cam means for operating the shuttle valve which directs the flow of fluid from one cylinder to the other and simultaneously vents the non-pressurized cylinder.
FIGURE 9 is a view similar to FIGURE 8 with the cam means and shuttle valve in a different position of operation.
Figure 10:
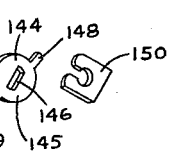
FIGURE 10 is an exploded view showing various components of the cam means for actuating the shuttle valve.

As illustrated in FIGURES 8, 9 and 10, the means for controlling the shuttle valve 62 comprises a pair of pivots 112 which extends transversely from the block 12 and pivotally support a pair of corresponding rocker arms 114, 115 adapted to cooperate with a cam element 117 which is pivotally carried on the shaft 17, but is free to oscillate on its bearing irrespective of the movement of the shaft. This cam element 117 may be constructed as desired, but, as depicted in FIGURE 10, it is preferably stamped out of sheet metal stock to provide a pair of generally V-shaped cams 119, 120 having rearwardly extending walls integral therewith for a purpose that will appear more fully below. The upper ends of the rocker arms 114, 115 are provided with suitable cam followers that are continuously yieldably urged into engagement with the cams 119, 120 by a helical expansion spring 122 carried by lugs 123 on the lower ends of the arms. The upper end of the rocker arm 114 is provided with a notch 125, a rounded cam follower 126, and an abutment 127 adjacent the pivot 112. The arm 115 is similarly provided with a notch 128 and cam follower 129 and abutment 130.

An elongate oscillating member 132 is pivotally carried by the drive shaft 17, this member likewise being movable independently of the shaft. This oscillating member is provided with an upper head portion having a slot 134 therein which loosely receives the valve 62, the body of which is of hollow cup-shaped construction and includes a flange 135 around the rim thereof. The flange is adapted to be disposed between the oscillating member 132 and the front face of the block 12, and as the member 132 oscillates about its pivot the valve 62 is moved to each of its several operative positions. Thus, valve 62 is operated to alternately place the exhaust port 92 in the block in communication with first one and then the other of the ports 85 and 86, and simultaneously expose the ports 86 and 85, respectively to the fluid in chamber 89 to effect operation of the motor as described above.

The oscillating member is provided with notches 136 and 137 adjacent the head portion and its other extremity or tail portion 139 is provided with a rubber bumper 140 in the form of a sleeve surrounding the tail. The tail is preferably notched as shown so that portions of the sleeve will contract into the notches to automatically lock the sleeve in place. The cam element 117 is mounted on shaft 17 in such a manner that the rearwardly turned walls of the cams 119 and 120 surround but are spaced from the oscillating member 132 whereby the rearwardly turned walls of the cams 119 and 120 are adapted to periodically engage the notches 136 and 137 to drive the oscillating member from one side to the other. To obtain this relationship, the oscillating member is provided with a central bearing aperture 141 which preferably engages the large circular end portion of the shaft 17 to maintain the member in operative relationship to the parts to be engaged thereby. It will be noted that the oscillatory member rides on the large cylindrical portion of the shaft 17 whereas the cam element 117 has a bearing aperture that cooperates with a reduced cylindrical portion 142 of the shaft and abuts a shoulder 143 between said cylindrical portions on the shaft for locating the cam relative to the oscillating member 132.

A lost-motion drive is provided between shaft 17 and cam element 117 which includes a trip washer or driver 144 having a central portion 145 through which a rectangularly shaped slot 146 is formed of such a size as to engage a rectangular extension 147 formed on the end of the drive shaft 17 whereby the drive shaft and trip washer will be oscillated in unison. The trip washer has a pair of laterally extending lugs 148 and 149 extending in diametrically opposite directions from the edge portions thereof. The lugs 148, 149 are rotated with the shaft 17 and alternately engage with the edges of the cams 119 and 120 for driving the cams into engagement with one of the notches 136, 137 to drive the oscillating member 132 for moving said oscillating member between the positions shown in FIGURES 8 and 9. The shuttle valve 62 carried by the oscillating member 132 is thereby moved from one position of operation to another. A C-shaped spring nut 150 engages with the end 147 of the shaft 17 for holding the trip washer 144, cam 117, and oscillating member 132 assembled on the shaft 17. The functioning of the spring-pressed rocker arms 114 and 115 are well known in the art, they cooperate with the cams 119 and 120 to effect a rapid snap movement of the valve 62 from one position to the other and also serve to hold the valve in either position until the lost-motion drive means again comes into play.

During normal operation of this mechanism, when the actuating knob 97 is moved to the "on" position, the valve 60 is moved to a position whereby fluid under pressure will flow through the valleys in the valve 60, chamber 89 and into the pressure chamber 14 to move to pistons 21, 22 to the right. As the pistons move, the attached cables 35, 36, 37 will rotate the pulley 34, shaft 17 and trip washer 144 in one direciton to take up the lost motion at which point the lugs 148, 149 on the washer 144 will engage with and move the cam 117 until the cam surface 119 snaps out of the notch 125 and the cam surface 120 snaps into the notch 128 thereby moving the oscillating member 132 and valve 62 to the right and into the position shown in FIGURE 9 to connect port 85 with the exhaust and to permit fluid under pressure to enter port 86 to move pistons 21, 22 to the left, referring to FIGURES 1 and 2, whereby the oscillation of shaft 17 is reversed. After the lost motion between the trip member 144 and cam member 117 has been taken up the cam is driven to snap back into the position shown in FIGURE 8 whereby the cycle is completed. Each time the cam member 117 is rotated in this manner by the trip washer 144 beyond a certain point, spring-pressed rocker arms 114 and 115 drive the cams 119 and 120 against the oscillating member 132 to move valve 62 from one side to the other and the direction of motion of the pistons is reversed. As the pistons are thus caused to reciprocate, the cables 35, 36 and 37 connected thereto will oscillate the pulley 34 driving the shaft 17. The shaft 17 not only causes the reversal of the direction of flow of fluid through the shuttle valve 62 but also is adapted to be connected to the wiper drive mechanism to drive the wiper arms and blades over the windshield of a motor vehicle or the like.

The fluid admitted to the valve housing can vary in pressure through a wide range without materially changing the basic operation of the system. In this way once the demands of the wiper assembly have been determined both as to weight of the wiper arm and blade and as to pressure load between the blade and windshield, it is possible to determine the fluid pressure differential that will be required to drive the motor.

Having thus described my invention, it is obvious that various modifications may be made in the same without departing from the spirit of the invention, and therefore, I do not wish to be understood as limiting myself to the exact forms, constructions, arrangements, and combinations of parts herein shown and described.

I claim:

1. A motor having an elongate housing, means reciprocably mounted in said housing, a shaft journaled on said housing at a location between the ends of the housing, a pulley carried on said shaft, flexible means acting between said reciprocating means and said pulley for oscillating said shaft and pulley, and means carried by said reciprocating means for tightening or loosening the flexible means.

2. A motor having a housing, elongate means reciprocably mounted in said housing, means for driving said elongate means, a shaft journaled on said housing transversely thereto, a pulley carried on said shaft, elongate flexible means connected to and substantially surrounding the pulley and having ends attached to the driven means at a location within the confines of the housing in a manner whereby said elongate means when driven by said driving means will cause the flexible means to oscillate the shaft and pulley, and means carried by said elongate means operatively connected to one of the ends of the flexible means in a manner whereby the latter may be tightened or loosened about the pulley.

3. In a fluid motor comprising a housing, a pair of interconnected pistons reciprocably mounted in said housing, and a drive shaft journaled on said housing for oscillatory motion about an axis thereof, the combination of means for changing the reciprocating motion of the pistons to oscillating motion of the shaft comprising a pulley movable with said shaft and having a plurality of grooves formed around the peripheral face portion thereof, a pair of separate flexible cable means secured in said grooves by a single means carried by said pulley and having at least one end portion of each attached to one of said pistons whereby movement of the pistons in one direction will rotate the shaft through a determined arc of rotation in one direction, and movement of the pistons in the opposite direction will rotate the shaft through a determined arc of rotation in the opposite direction.

4. A subassembly for use with a fluid motor comprising a pair of pistons joined by an elongate bridge, an anchor carried by each extremity of the bridge, a shaft having a pulley with separate peripheral grooves therein, cable means having portions seated and secured in certain of the grooves and end portions secured to one of the anchors, other cable means having portions seated and secured in other of the grooves and portions secured to the other anchor in a manner whereby the bridge and pistons when reciprocated as a unit will rotate said shaft.

5. The structure defined in claim 4, including means for adjusting one of the anchors for varying the tension in the cables.

6. A motor having an elongate housing, means reciprocably mounted in said housing, a shaft journaled on said housing at a location between the ends of the housing, a pulley carried by said shaft, flexible means acting between said reciprocating means and said pulley for oscillating said shaft and pulley, and cam means carried by said reciprocating means for adjusting the flexible means.

7. A motor having a housing, driven means reciprocably mounted in said housing, a shaft journaled on said housing transversely thereto, a pulley carried by said shaft, elongate flexible means connected to and substantially surrounding the pulley and having ends extending tangentially therefrom and attached to the driven means at a location within the confines of the housing in a manner whereby reciprocatory movement of the driven means will cause the flexible means to oscillate the shaft and pulley, and means carried by the driven means operatively connected to one of the ends of the flexible means in a manner whereby the latter may be adjusted about the pulley.

8. In a motor comprising a housing, a pair of interconnected means reciprocably mounted in said housing, and a drive shaft journaled on said housing for oscillatory motion about an axis thereof, the combination of means for changing the reciprocating motion of the means to oscillating motion of the shaft comprising a pulley keyed to said shaft and having a plurality of grooves formed around the peripheral face portion thereof, a pair of separate flexible cable means seated in said grooves and having at least one end portion of each attached to one of said means whereby movement of the means in one direction will rotate the shaft through a determined arc of rotation in one direction and movement of the means in the opposite direction will rotate the shaft through a determined arc of rotation in the opposite direction, and means common to both cable means securing them to said pulley.

9. A motor having a housing with at least one chamber therein, elongate means reciprocably mounted in said chamber, a pair of longitudinally spaced connectors carried by said elongate means, the wall of the housing having a slot therein, a shaft journaled in said housing transverse to said slot, a pulley keyed to said shaft partially within said housing and slot and having a plurality of grooves formed around the peripheral face portion thereof, a first flexible means having end portions seated and secured in certain of said grooves in said pulley and an intermediate portion attached to one of said connectors whereby movement thereof will rotate the shaft a controlled amount in one direction, and a second flexible means having an end portion seated and secured in another of the grooves and an end portion attached to the other of the connectors for providing controlled rotation of the shaft in the opposite direction whereby the oscillating movement of the shaft is produced.

10. In a motor the combination of a cylindrical housing having a chamber in each end portion thereof, means reciprocably mounted in each chamber, means for interconnecting said means for unitary operation thereof, the wall of the housing having an opening between the chambers, an oscillating shaft journaled transverse to said opening and having an axis thereof lying in a plane perpendicular to the longitudinal axis of the housing, and means for converting reciprocating motion of the means to oscillating motion of the shaft, said means comprising a drive pulley movable with said shaft, said pulley having a plurality of separate grooves formed in the peripheral portion thereof and a recess extending parallel to the axis of said shaft, a plurality of flexible means respectively disposed in the grooves about said pulley in opposite directions and having one end of each attached to one of the pistons, and means disposed substantially in said recess and engaging said flexible means for locking them in place whereby reciprocatory movement of the pistons imparts oscillatory motion to the shaft.

11. A subassembly comprising an elongate member, a rotatable shaft provided with a pulley, means on the member disposed on opposite sides of the shaft for supporting the member for reciprocation, flexible means acting between said member and pulley for oscillating the shaft and pulley as a unit, and cam means carried by the member and operatively associated with said flexible means for tightening or loosening the latter against the pulley.

References Cited in the file of this patent

UNITED STATES PATENTS

| | | |
|---|---|---|
| Re. 15,502 | Folberth | Dec. 5, 1922 |
| 1,660,487 | Gauthier | Feb. 28, 1928 |
| 1,830,354 | Farr | Nov. 3, 1931 |
| 1,834,607 | Dove | Dec. 1, 1931 |
| 2,263,151 | White | Nov. 18, 1941 |
| 2,378,320 | O'Shei | June 12, 1945 |
| 2,450,653 | Galley et al. | Oct. 5, 1948 |
| 2,684,660 | MacPherson | July 27, 1954 |
| 2,722,200 | Horton et al. | Nov. 1, 1955 |
| 2,889,818 | Riester et al. | June 9, 1956 |

FOREIGN PATENTS

| | | |
|---|---|---|
| 723,953 | France | Jan. 23, 1932 |